US010843952B2

(12) United States Patent
Kagan (10) Patent No.: US 10,843,952 B2
(45) Date of Patent: Nov. 24, 2020

(54) CONTINUOUS, APPROXIMATELY REAL-TIME RESIDENTIAL WASTEWATER TREATMENT SYSTEM AND APPARATUS (71) Applicant: Avi Kagan, Mount Juliet, TN (US)

(72) Inventor: Avi Kagan, Mount Juliet, TN (US)

( * ) Notice: Subject to any disclaimer, the term of this patent is extended or adjusted under 35 U.S.C. 154(b) by 0 days.

(21) Appl. No.: 16/798,025

(22) Filed: Feb. 21, 2020

(65) Prior Publication Data
US 2020/0270158 A1 Aug. 27, 2020

Related U.S. Application Data (60) Provisional application No. 62/809,790, filed on Feb. 25, 2019.

(51) Int. Cl.
*C02F 9/00* (2006.01)
*C02F 3/28* (2006.01)
(Continued)

(52) U.S. Cl.
CPC .............. *C02F 9/00* (2013.01); *B01D 33/06* (2013.01); *B01D 33/37* (2013.01); *B01D 33/44* (2013.01); *C02F 1/008* (2013.01); *C02F 1/001* (2013.01); *C02F 1/441* (2013.01); *C02F 1/46104* (2013.01); *C02F 1/78* (2013.01); *C02F 3/2826* (2013.01); *C02F 2201/782* (2013.01); *C02F 2209/005* (2013.01); *C02F 2209/05* (2013.01); *C02F 2209/06* (2013.01); *C02F 2209/08* (2013.01); *C02F 2209/11* (2013.01); *C02F 2303/16* (2013.01); *C02F 2303/26* (2013.01)

(58) Field of Classification Search
CPC .... C02F 9/00; C02F 1/463; C02F 1/78; C02F 3/06; C02F 1/441; C02F 3/1242; C02F 1/46109; C02F 1/4676; C02F 1/46; C02F 1/465; C02F 1/72; C02F 3/12; B09B 3/00; B02C 18/0084
See application file for complete search history.

(56) References Cited

U.S. PATENT DOCUMENTS

2010/0112242 A1* 5/2010 Medoff .................. D21C 9/007
428/22
2011/0315626 A1* 12/2011 Lu ........................... C12M 45/04
210/604
(Continued)

*Primary Examiner* — Claire A Norris
(74) *Attorney, Agent, or Firm* — Michael L. Greenberg, Esq.; Greenberg & Lieberman, LLC (57) ABSTRACT A system and apparatus configured to facilitate on-site treatment of wastewater from a residence is described. The system is configured to immediately treat wastewater as it is generated, on an as-needed basis, and works to remove undissolved down solids and reduce dissolved materials concentrations to a uniform level prior to transmission of the wastewater to municipal waste water treatment facilities and/or any non-drinking application. The system employs a two-stage treatment apparatus where the first stage is configured to pre-grind and decompose undissolved solids of the wastewater and the second to reduce dissolved materials concentrations. The first stage uses turbidity meters, and the second stage uses pH, BOD and conductivity to ensure a uniform output from each stage. A fast decomposer has rotating filters which operational modes ensure that the filters do not become clogged with solids in a 'cake' form simultaneously.

7 Claims, 7 Drawing Sheets (51) Int. Cl.
  *B01D 33/06* (2006.01)
  *B01D 33/44* (2006.01)
  *B01D 33/37* (2006.01)
  *C02F 1/00* (2006.01)
  *C02F 1/44* (2006.01)
  *C02F 1/461* (2006.01)
  *C02F 1/78* (2006.01)

(56) References Cited

U.S. PATENT DOCUMENTS

2012/0228117 A1\* 9/2012 Panunzio ................ C02F 9/00
  203/10
2014/0151294 A1\* 6/2014 Prior ........................ C02F 9/00
  210/605

\* cited by examiner

CONTINUOUS, APPROXIMATELY REAL-TIME RESIDENTIAL WASTEWATER TREATMENT SYSTEM AND APPARATUS

CONTINUITY

This application is a non-provisional patent application of provisional patent application No. 62/809,790, filed on Feb. 25, 2019, and priority is claimed thereto.

FIELD OF THE PRESENT INVENTION

The present invention relates to the field of wastewater management, and more specifically relates to a new form of waste treatment system for single residential zones configured to treat waste water immediately upon generation to facilitate an expedited treatment process and ensure a more uniform waste water input stream to waste treatment facilities.

BACKGROUND OF THE PRESENT INVENTION

Conventionally, residences are usually designed to employ local/municipal waste water treatment facilities, and as such, waste water is ported to these facilities through city plumbing structures. Alternately, a septic tank is employed at the location of the residence to safely extract wastewater from solids. In such cases, solids are removed periodically via a waste management service.

Presently, when the domestic wastewater is sent to the wastewater facility, the waste water is mixed with other waste water streams which results in high variability of the waste water composition which the treatment operations must control. This can be difficult due to the speed of the treatment operations and the unpredicted fluctuations. When the house is not connected to the municipal sewer, the wastewater with solids flows into large tanks where the waste water is supposed to diffuse into the surrounding soil, leaving the solid sediments to accumulate in the tank. These accumulated solids are withdrawn periodically.

Unfortunately, the diffusion of water to the near soil is slow, and the speed of the diffusion depends on the local soil composition and structure, such as how rocky the soil is, the current outdoor temperature, and the uniformity of the soil. These aspects commonly affect the hydraulic conductivity of the soil. Often, by the time the solids have accumulated, the solids are a source of vapors which are usually released to the surrounding atmosphere. This can cause an unpleasant smell in one's backyard or neighborhood until the solids are removed by waste management.

If there was a way in which wastewater could be treated immediately at the residence prior to conveying the waste water to a treatment facility, the process of treatment at the treatment facility would be easier, more uniform, and more cost effective.

Thus, there is a need for a more effective means of treating wastewater at the residence prior to transport of the wastewater to local/municipal treatment facilities. Such a system preferably treats wastewater such that solids are broken and decomposed down prior to conveyance to the treatment facility. Additionally, such a system would help to make the wastewater arriving at the treatment facility more uniform from all wastewater sources (residences), leading to expedited turnaround, and more efficient and effective waste management. Such a system is preferably equipped with pre-programmed-control valves, and/or PLC configured to manage requisite subsystems to ensure continued operation of the system with little maintenance. Additionally, such a system is preferably equipped with oxidizing electrochemical reactors and a reverse osmosis system with an optional EM wave source to reduce the dissolved constituents concentrations to facilitate the degradation of solid wastes within the system faster and more efficiently than traditional systems.

SUMMARY OF THE PRESENT INVENTION

The present invention is a two-stage wastewater treatment system and apparatus configured for use in residential wastewater systems to immediately treat wastewater after it is generated.

Via the system of the present invention, wastewater is treated immediately after being generated via a fast process which is safe to the user, resulting in non-toxic vapors and nearly drinking water quality output, all while assuring consistent use with minimal operational and maintenance costs. The system and apparatus of the present invention is preferably portable, with a low footprint size and is connected directly to the house's (or building's, or commercial facility's) sewer outlet.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

The present invention will be better understood with reference to the appended drawing sheets, wherein.

DETAILED DESCRIPTION OF THE PREFERRED EMBODIMENT

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1A:
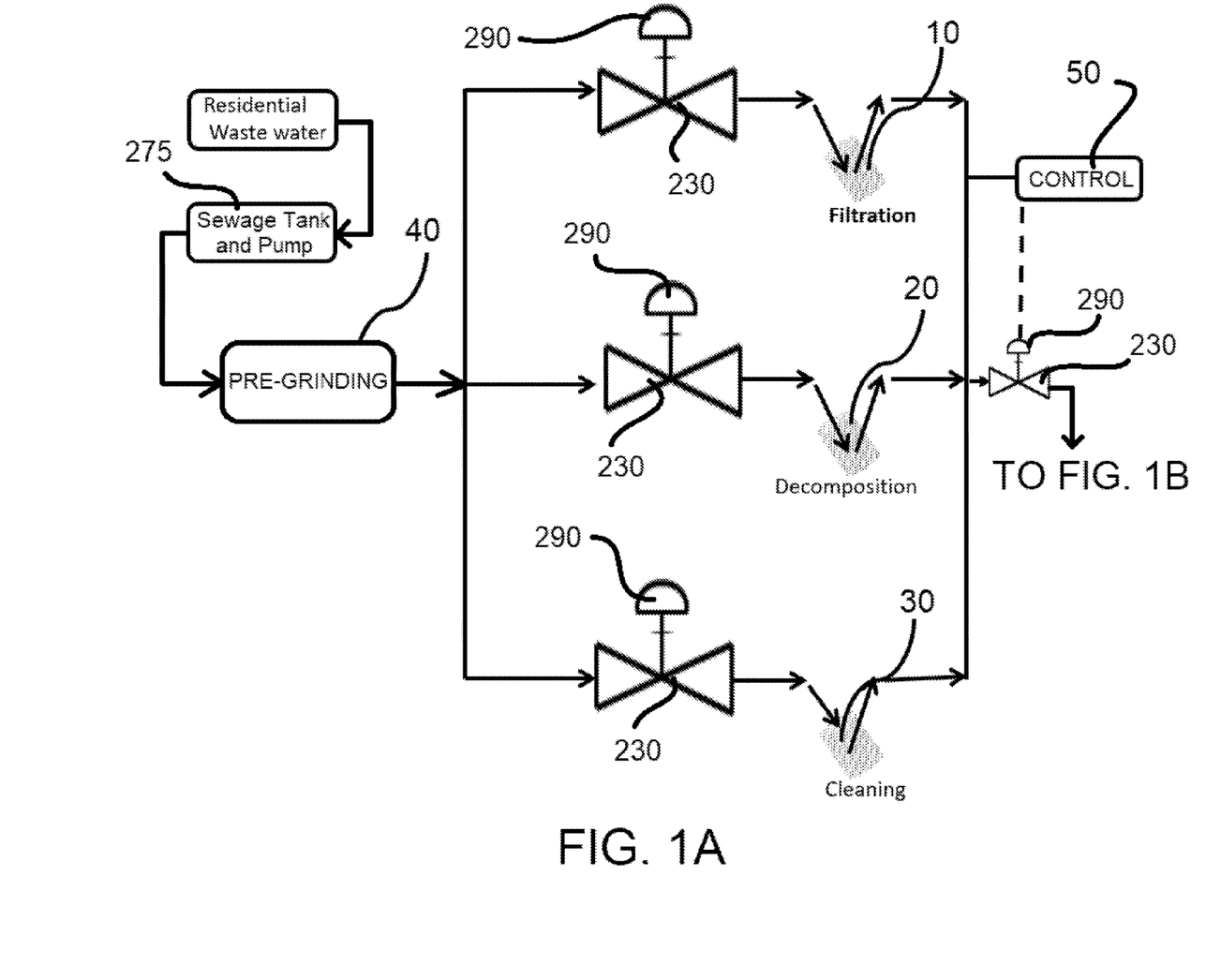
FIG. 1A exhibits a schematic flow chart showing the flow of wastewater through the first stage of the system of the present invention to remove solids and/or undissolved materials.
Figure 1B:
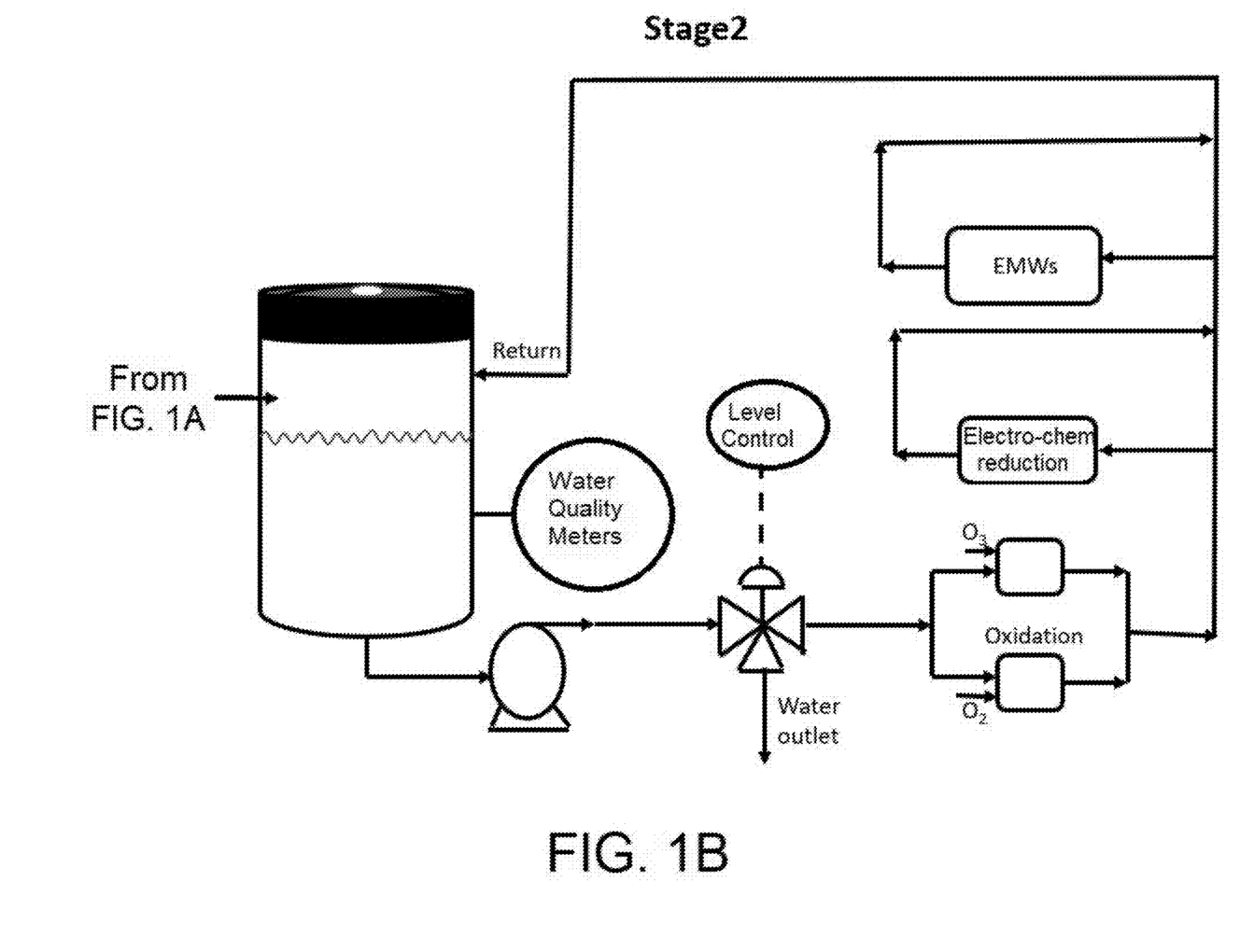
FIG. 1B shows a continuation of the schematic flow chart, detailing the second stage of the system of the present invention to reduce dissolved materials concentration.
Figure 5:
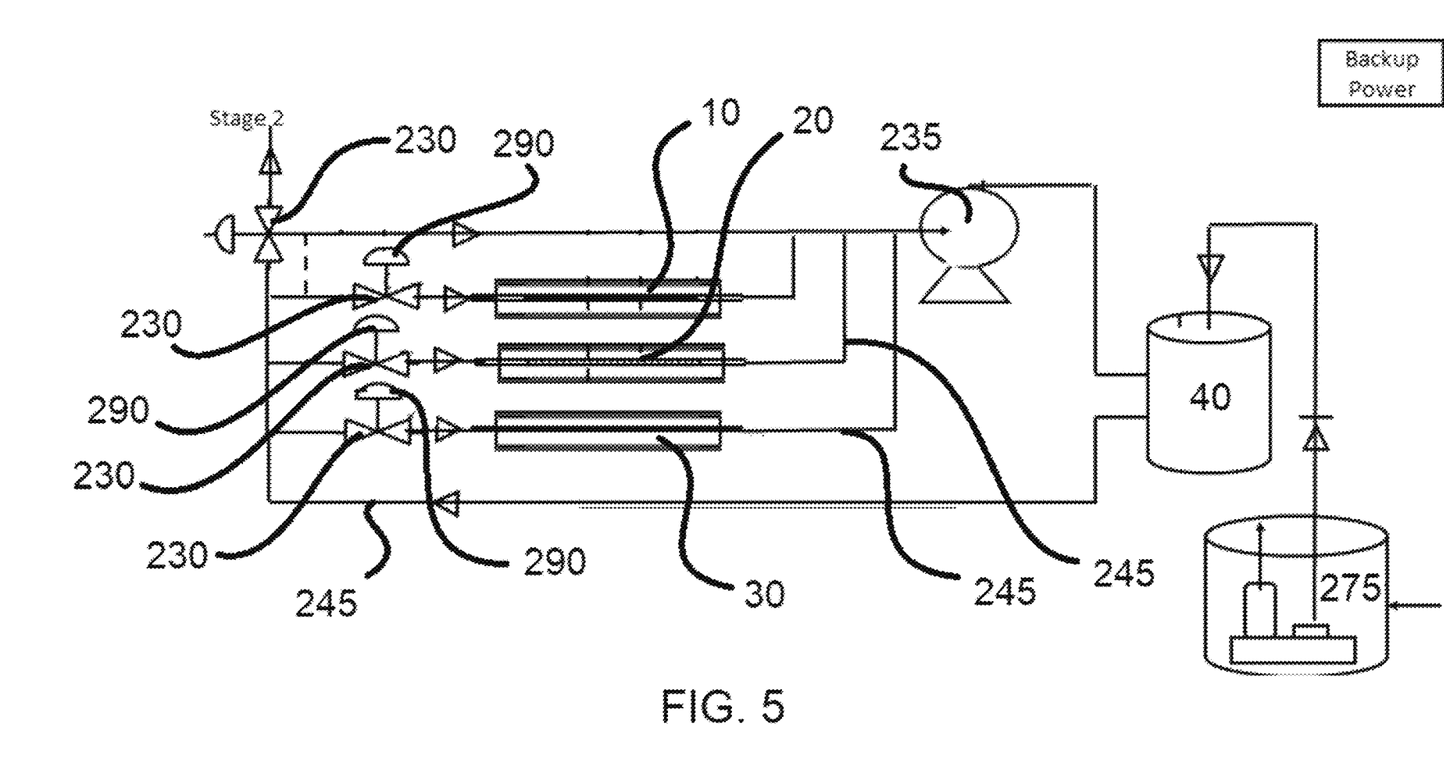
FIG. 5 depicts a primary embodiment of the overall system-view of the first stage of the system of the present invention when assembled and in use.
Figure 6:
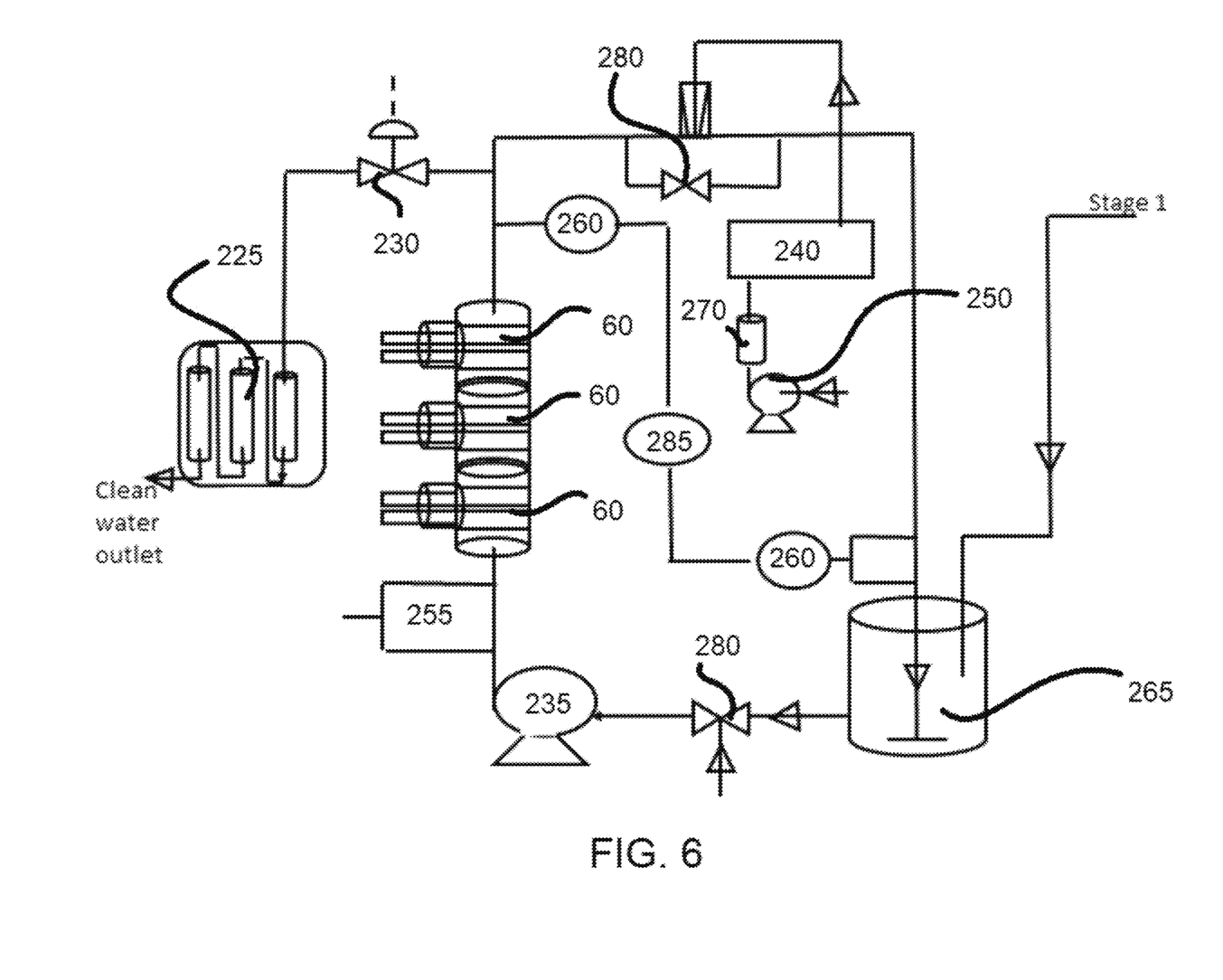
FIG. 6 details the primary embodiment of the overall system-view of the second stage of the system of the present invention when assembled and in use.

The present invention is a two-stage waste water treatment system and apparatus configured for use at residences to treat waste water immediately upon generation to facilitate a reduction in the effort required to break down and/or remove solids, and to ensure a more uniform waste water stream to a municipal or local waste water treatment facility. Stage 1 is depicted in FIG. 5, and Stage 2 is shown in FIG. 6. The system of the present invention is equipped with at least one grinder (40), electronic control valves (230), a first decomposer (10), a second decomposer (20), a third decomposer (30), control systems (50) including at least one turbidity meter, and a dissolved materials concentrations reduction stage as depicted in FIG. 1A and FIG. 1B, also referenced as monitors.

Figure 3:
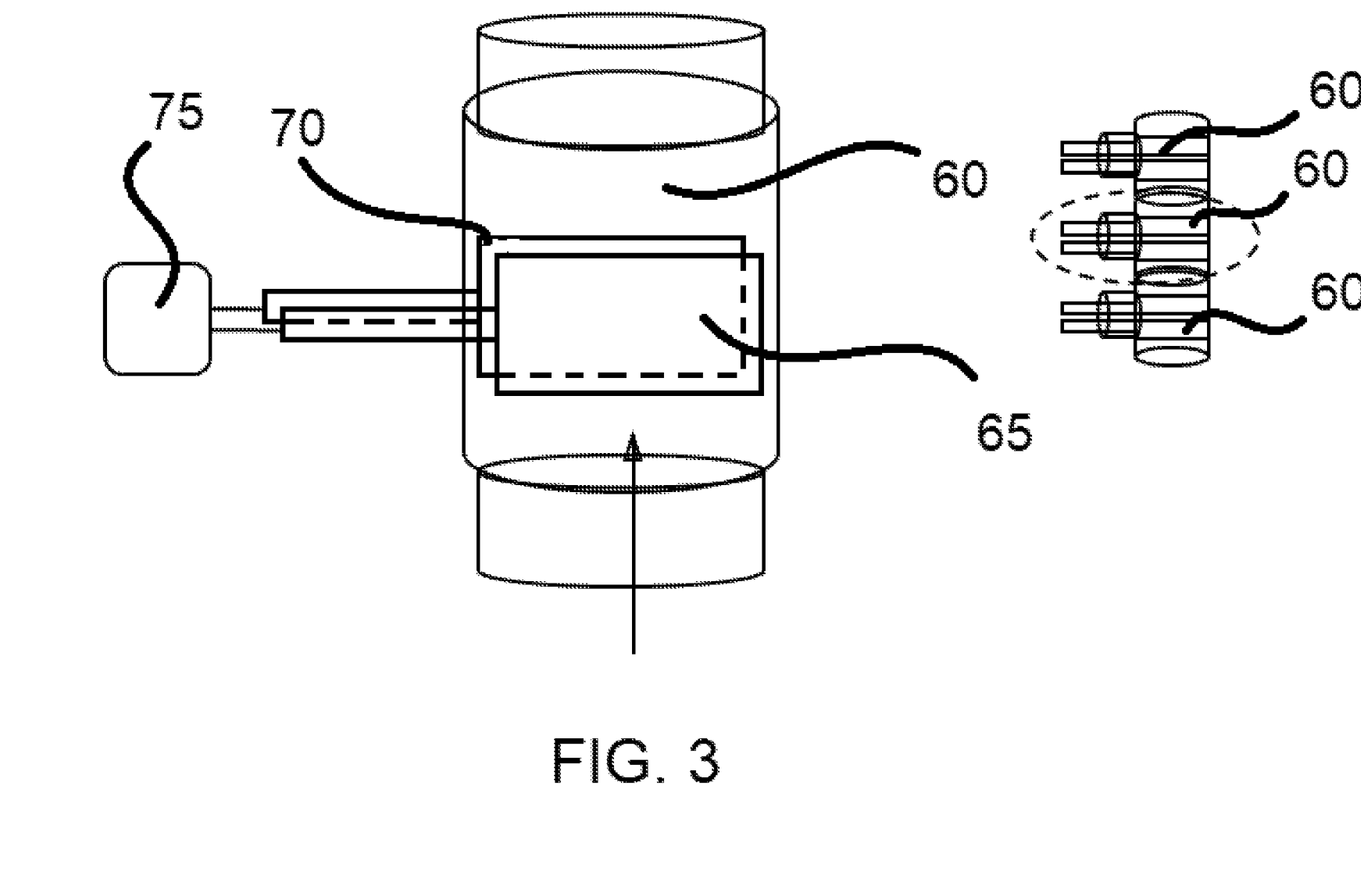
FIG. 3 exhibits the electro-chemical reactor of the present invention as depicted from the side.

An electronic control system is preferably in place to regulate the opening and closing of the electronic valves, the decomposers (10, 20, 30) and the at least one grinder (40) based on the input of the monitor(s) via the control system (50). The decomposers (10, 20, 30) are each equipped with switches (290) which are regulated by a PLC. These components, as well as the at least one grinder (40) are preferably powered via 120V AC power and is preferably wired into the power supply of the residence. It is envisioned that rechargeable batteries may be present in the system in order to power one or more alarms to signify issues with the system. Similarly, a generator may be optionally added to the system to be triggered by a signal relayed from the backup system powered by the rechargeable batteries. It should be understood that each iteration of electrochemical reactor (60) is equipped with a cathode (65) and an anode (70) as shown in FIG. 3. A programmable power supply (75) is preferably present to manage each electrochemical reactor (60).

Primary components of the system of the present invention, as depicted in Stage 1, FIG. 5, and Stage 2, FIG. 6, preferably include: a circulation pump (235) configured to circulate the wastewater through the system, stainless steel lines (245), a reverse osmosis system (225), control valves (230), an ozone generator (240), at least one air pump (250), a Total Dissolved Solids (TDS) sensor (260), a TDS display (285) at least one water tank (265), a sewage pump and tank (275), manual valves (280), and an air dryer column (270).

Figure 4:
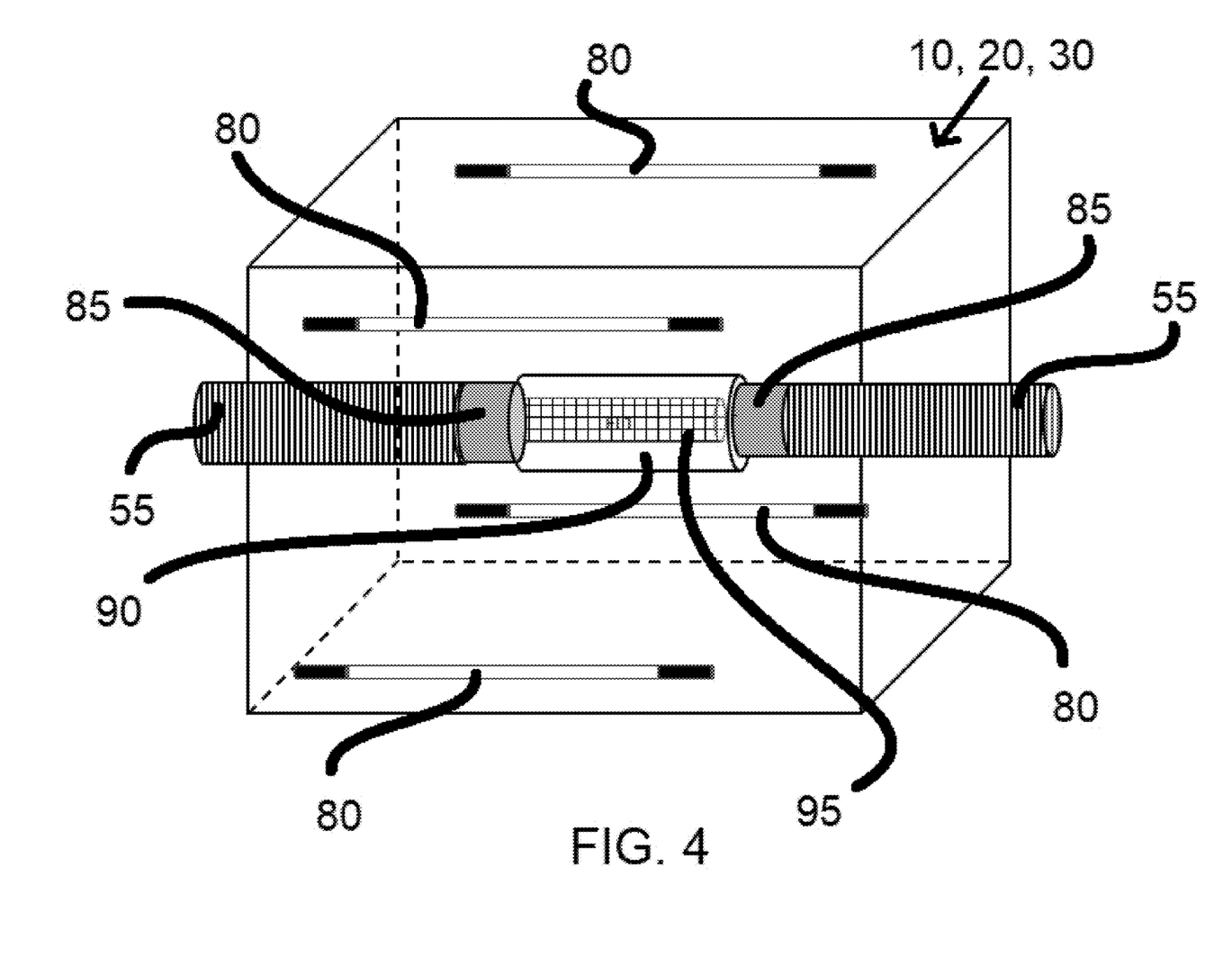
FIG. 4 depicts a view of the decomposer of the present invention as depicted from the side.

The decomposers (10, 20, 30), as shown in FIG. 4, are preferably equipped with heat sources (80) distributed around the interior of the decomposers (10, 20, 30). The wastewater travels through a glass tube (90) which contains a filter mesh (95) centrally disposed between tube edges (85). A nipple NPT (55) is present on both ends of the glass tube (90) beyond the tube edges (85) as shown in FIG. 4.

Via the system of the present invention, the wastewater treatment provided by the system is preferably divided between two main consequential operations detailed as follows:

1) First Stage—Solids removal: The undissolved solids of the wastewater undergo a pre-grinding operation to avoid large solid particles entering the system as shown in FIG. 1A. The quality of the grinded wastewater is monitored by turbidity meters in Stage two. Following the grinding, the wastewater stream goes through a set of active filters which encircle around the mainstream pipe. In each filter, there is a build-up of solid "cake", when it operates at Filtration Mode until the wastewater is moved to its next filter operating at Decomposition mode.

During these operations, the third decomposer (30) is in a Cleaning mode. Once the decomposer (10, 20, or 30) at Filtration mode ends its filtrating process and the wastewater flows to the next filter (now operating in Filtration mode), this filter will start operating in Decomposition mode. Thus, the filter with "cake" works as a decomposer wherein the solids with a low amount of water are decomposed. The primary result of this process is the release of non-toxic vapors. When the filter is clean, the filter is configured to await its turn to be used again. The filters are preferably housed in the decomposer box of each decomposer (10, 20, 30), and each Decomposer operation is electronically controlled.

The flow through each decomposer (10, 20, 30) is preferably controlled via an independent control valve (switches (290)) which is configured to open and close in response to system commands. The control system for the Control valves and decomposers enable a custom-made programming for each residential wastewater based on the flow and chemical composition determined prior to operation. Filters employed in the system of the present invention are preferably cylindrical to avoid dead flow zones within each decomposer (10, 20, 30). A filter is considered ready for decomposer operation when it is partially clogged. The specific time for each Decomposer operation is based on the specific flow and decomposition of residential wastewater determined prior to operation.

There are three filters in the preferred embodiment of the present invention, one disposed within each decomposer (10, 20, 30): a first filter disposed under flow with cake build-up, a second filter disposed under the decomposition process, and a third filter for cleaning. Each filter disposed within each decomposer (10, 20, 30) of the present invention is preferably made of high-quality stainless steel which may be coated with a resilient coating to help ensure that the filters remain effective for many years. The diameter of each filter is preferably between one-half inch and two inches.

The solids removal process of the present invention is a stand-alone circulation cycle which does not allow any of the wastewater to flow to a second stage of the present invention until the level of undissolved solids complies with the requirements set for water turbidity. Once the stream is found to be ready for the second stage, a control valve is opened, and the wastewater flows to the second stage where dissolved compounds concentrations are reduced to comply with Local and Federal requirements for the water outlet from the water.

It should be noted that all pipelines (245) and fittings present in Stage 1 are preferably composed of Stainless Steel rather than galvanized steel. This is to ensure that the pipes and fittings do not rust, and that any leakage is eliminated. Similarly, Stainless Steel is more advantageous for tap water quality, and can withstand higher heat tolerances. 316 Stainless Steel is preferred due to its high level of sustainability.

2) Second Stage—Dissolved Compound Concentration Reduction: The second stage of the system of the present invention is configured to reduce the concentration of dissolved compounds to a level which enables the water to be output to the water treatment facility, or to be used in as non-potable water as shown in FIG. 1B. The second stage operation is performed by circulating the water into substations where dosing of oxygen and ozone via an ozone generator (240) are made with no need for any chemical inlet. Once the level of oxygen reaches its set point; the water goes through electrochemical and/or optional electromagnetic interaction which results in the reduction and/or decomposition of the dissolved compounds. The programmed control system control includes the outlet control valve of the present invention. When this valve is opened, the cleaned water is permitted to flow out to the wastewater treatment facility via sewage plumbing, or to be used as non-potable water. The control system controlling the controlled valve outlet to the reverse osmosis system is preferably programmed to ensure the quality of the outlet water.

Figure 2:
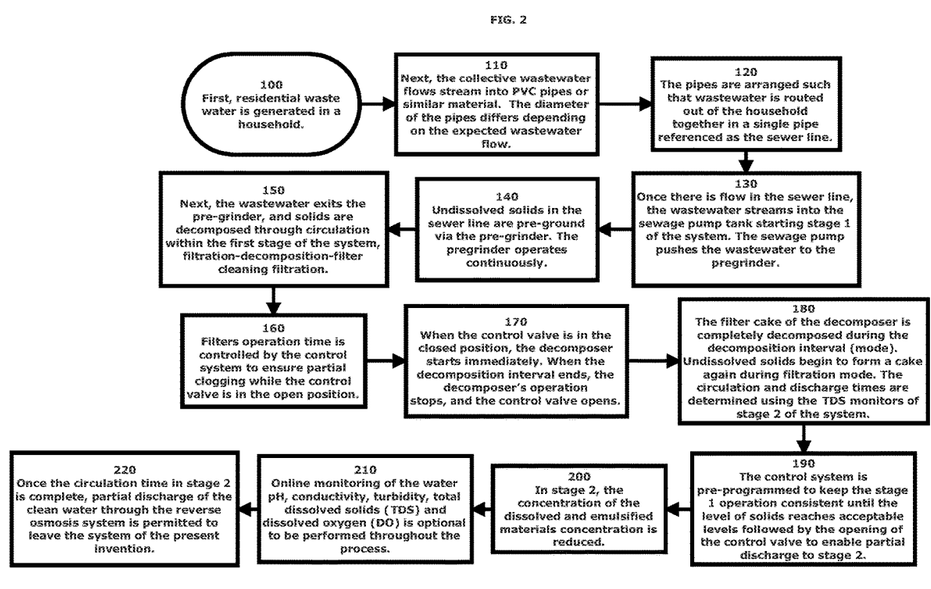
FIG. 2 depicts a flow chart detailing the process of use of the system and apparatus of the present invention.

The overall process of use of the system and apparatus of the present invention, as depicted in FIG. 2, is preferably as follows:

1. First, residential wastewater is generated in a household. (100) Conventionally, wastewater is generated in the kitchen, bath, and toilet.

2. Next, the collective wastewater flows stream into PVC pipes or similar material. The diameter of the pipes differs depending on the expected wastewater flow. (110)

3. The pipes are arranged such that wastewater is routed out of the household together in a single pipe referenced as the sewer line. (120)

4. Once there is flow in the sewer line, the wastewater streams into the sewage pump tank starting stage 1 of the system. The sewage pump pushes the wastewater to the pre-grinder. (130)

5. Undissolved solids in the sewer line are pre-ground via the pre-grinder. The pre-grinder operates continuously. (140) Undissolved solids in the sewer line are grinded to reduce their size to an optimal one that will enable easy filtration on one hand and easy decomposition on the other hand. The circulation of flow is through the grinder so that the grinding operation is continuous.

6. Next, the wastewater exits the pre-grinder, and solids are decomposed through circulation within the first stage of the system, filtration-decomposition-filter cleaning filtration. (150)

7. Filters operation time is controlled by the control system to ensure partial clogging while the control valve is in the open position. (160) The electronic control of the system is configured to open and close the control valves in accordance with a control system program, resulting in the change of the decomposer's operating mode.

8. When the control valve is in the closed position, the decomposer starts immediately. When the decomposition interval ends, the decomposer's operation stops, and the control valve opens. (170) During this time, the other two control valves of the other two decomposers are open.

9. The filter cake of the decomposer is completely decomposed during the decomposition interval (mode). Undissolved solids begin to form a cake again during filtration mode. The circulation and discharge times are determined using the TDS monitors of stage 2 of the system. (180)

10. The control system is pre-programmed to keep the stage 1 operation consistent until the level of solids reaches acceptable levels followed by the opening of the control valve to enable partial discharge to stage 2. (190). For clarity, stage 1 circulation is preferably kept constant at all times. The control, based on the control system's program, after certain number of cycles, including the operations as Decomposers of all three lines, may continue the circulation but also open the 3-way valve letting the treated waste water of stage 1 flow to stage 2, where dissolved substance concentration reduction is conducted.

11. In stage 2, the concentration of the dissolved and emulsified materials concentration is reduced. (200) By raising the oxidation level of the dissolved compounds, electrochemical reduction efficiency is increased. These reactions are fast and occur at relatively very low energy. Some metal ions' concentration will be reduced by electrochemical deposition.

12. Online monitoring of the water pH, conductivity, turbidity, total dissolved solids (TDS) and dissolved oxygen (DO) is optional to be performed throughout the process. (210)

13. Once the circulation time in stage 2 is complete, partial discharge of the clean water through the reverse osmosis system is permitted to leave the system of the present invention. (220) For clarity, once the water complies with all operational requirements, the water circulating at stage 2 is permitted to leave the system (flow out) through the Reversed Osmosis (RO) system. The reverse osmosis system of the present invention is preferably equipped with three cartridges.

The system of the present invention preferably employs a Programmable Logic Controller (PLC) to facilitate management and control of switches associated with various components of the system of the present invention. The PLC is preferably a Multi-channel PLC, with channels of the PLC assigned as follows:

| Stage | Channel | Symbole | Description | Description |
|---|---|---|---|---|
| 1 | 1 | MX1 | Grinder | |
| 1 | 2 | P1 | Pump | circulation |
| 1 | 3 | CV2 | Control value | 2-Way |
| 1 | 4 | CV3 | Control value | 2-Way |
| 1 | 5 | CV4 | Control value | 2-Way |
| 1 | 6 | CV5 | Control value | 3-way |
| 1 | 7 | SW 2_1 | Swithc on/Off | Heater 2_Source1 |
| 1 | 8 | SW 2_2 | Swithc on/Off | Heater 2_Source2 |
| 1 | 9 | SW 2_3 | Swithc on/Off | Heater 2_Source3 |
| 1 | 10 | SW 2_4 | Swithc on/Off | Heater 2_Source4 |
| 1 | 11 | SW 3_1 | Swithc on/Off | Heater 3_Source1 |
| 1 | 12 | SW 3_2 | Swithc on/Off | Heater 3_Source2 |
| 1 | 13 | SW 3_3 | Swithc on/Off | Heater 3_Source3 |
| 1 | 14 | SW 3_4 | Swithc on/Off | Heater 3_Source4 |
| 1 | 15 | SW 4_1 | Swithc on/Off | Heater 4_Source1 |
| 1 | 16 | SW 4_2 | Swithc on/Off | Heater 4_Source2 |
| 1 | 17 | SW 4_3 | Swithc on/Off | Heater 4_Source3 |
| 1 | 18 | SW 4_4 | Swithc on/Off | Heater 4_Source4 |
| 2 | 19 | SW 4_4 | Pump | circulation |
| 2 | 20 | CV6 | Control valve | 2-Way |

It should be understood that other channels may be employed, or that the system may be wired in accordance with the needs of the installation at the time without venturing from the essence of the invention. Additionally, it should be noted that the sewage tank and pump are equipped with their own respective control systems. Critical operating components such as the Ozone generator (240), Reverse Osmosis system (225), air dryer column (270), TDS sensors (260), and electro-chemical reactors (60) are preferably configured to operate continuously, 24 hours a day, 7 days a week.

Some embodiments of the present invention are preferably outfitted with one EM Wave generator (255) configured to emit resonant frequencies known to be destructive to microscopic organisms. When needed, one EM wave generator (255), effectively present with one or more antennas in communication with a power source, may be disposed close to the electro-chemical reactor (60) to further assist the functionality of the system of the present invention.

It should be understood that the system of the present invention is presently configured for use in residential installations, and therefore users are instructed to specifically avoid the introduction of materials that are sticky or of a high viscosity and/or are un acceptable for most powerful residential garbage disposal, to the system in order to ensure continued operation of the at least one grinder of the present invention. In alternate embodiments of the present invention, the system may be equipped with an industrial grinder capable of grinding metals and/or plastics to facilitate the use of the present invention in industrial settings. Some embodiments of the present invention are preferably configurable for customized installation. The hardware of the present invention, including the pipes, circulation pump (235), air pump (250), water tank(s) (265), and other primary elements of the system of the present invention remain consistent across all installations, however if the demands of the installation require (or exhibit) higher flow rates than traditional residential or commercial installations, multiple iterations of elements of the system of the present invention may be deployed and installed. In the event that the location exhibits a wastewater composition which is significantly different from that of residential or conventional commercial installations, implementation of the system of the present invention requires custom-made feasibility checking. However, it should be understood that the modular nature of the present invention enables the system to function in parallel with other (secondary, tertiary, etc.) units if needed.

Similarly, it should be understood that the system of the present invention is configured to facilitate reuse of reclaimed, non-potable water around the household. As such, at least one pipe of the present invention is configured to convey such reusable water to applicable areas of the residence, such as to an irrigation system of the residence.

Other alternate embodiments of the present invention are preferably equipped with a vapor capture system which is configured to collect generated gasses such as methane to be used to generate energy. Such embodiments are configured to capture the byproducts of anaerobic bacteria present within the system of the present invention.

Other alternate embodiments of the present invention are preferably equipped with a vapor capture system which is configured to collect generated gases such as methane to be used to generate energy.

Future embodiments of the system of the present invention may include variations on the scaling of the system in order to accommodate larger or smaller residences, buildings, or similar installations.

It should be noted that the decomposer is programmed to operate repeatedly with operation time that is enough for partial clogging of the filter but not full clogging to avoid too much mass to be decomposed at filtration mode. The decomposition time is sufficient to assure that the whole filter content is decomposed without residues. The turbidity monitors (50), at Stage 2 support the determination of control system setup times to ensure the successful end of stage one where wastewater is released via a control valve (230) to second stage. The pH, BOD and Conductivity monitoring at stage 2, where dissolved materials concentrations are reduced, support the control system operation times setup ensuring the quality of the outlet treated and cleaned water.

Having illustrated the present invention, it should be understood that various adjustments and versions might be implemented without venturing away from the essence of the present invention. Further, it should be understood that the present invention is not solely limited to the invention as described in the embodiments above, but further comprises any and all embodiments within the scope of this application.

It should be understood that the system is configured to be adjusted to different wastewater compositions and state EPA requirements. The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

I claim:

1. A system for the on-site pre-treatment of wastewater, including solids, from a sewage line at a residence or business comprising:
    at least one grinder;
    a first decomposer;
    a second decomposer;
    a third decomposer;
    control valves, said control valves disposed in communication with said first decomposer, said second decomposer, and said third decomposer independently;
    monitors, said monitors configured to observe and report status of said first decomposer, said second decomposer and said third decomposer;
    electrochemical reactors, said electrochemical reactors disposed in communication with a programmable power supply;
    pipelines;
    a circulation pump, said circulation pump configured to circulate wastewater through said pipelines, to and from said decomposers;
    filter mesh, said filter mesh disposed within said first decomposer, said second decomposer, and said third decomposer;
    a programmable logic controller, said programmable logic controller configured to manage said control valves via electronic switches;
    wherein said first decomposer, said second decomposer, and said third decomposer are configured to operate in stages such that primary decomposition occurs in only one of said first decomposer, said second decomposer, and said third decomposer at one time; and
    wherein said filter mesh is disposed within glass tubes of said first decomposer, said second decomposer, and said third decomposer.

2. The apparatus of claim 1, wherein said pipelines facilitate the flow of wastewater through said filter mesh.

3. The apparatus of claim 2, wherein said at least one grinder is configured to grind the wastewater prior to its contact with one of the following: said first decomposer, said second decomposer, and said third decomposer.

4. The apparatus of claim 3, wherein said control valves are configured to automatically manage the flow of wastewater to said first decomposer, said second decomposer, and said third decomposer in accordance with any buildup of solids within at least one of said first decomposer, said second decomposer, and said third decomposer.

5. A system for the on-site pre-treatment of wastewater, including solids, from a sewage line at a residence or business comprising:

at least one grinder;
a first decomposer;
a second decomposer;
a third decomposer;
control valves, said control valves disposed in communication with said first decomposer, said second decomposer, and said third decomposer independently;
monitors, said monitors configured to observe and report status of said first decomposer, said second decomposer and said third decomposer;
electrochemical reactors, said electrochemical reactors disposed in communication with a programmable power supply;
pipelines;
a circulation pump, said circulation pump configured to circulate wastewater through said pipelines, to and from said decomposers;
filter mesh, said filter mesh disposed within said first decomposer, said second decomposer, and said third decomposer;
a programmable logic controller, said programmable logic controller configured to manage said control valves via electronic switches;
wherein said first decomposer, said second decomposer, and said third decomposer are configured to operate in stages such that primary decomposition occurs in only one of said first decomposer, said second decomposer, and said third decomposer at one time; and
heat sources, said heat sources disposed within said first decomposer, said second decomposer, and said third decomposer.

6. A system for the on-site pre-treatment of wastewater, including solids, from a sewage line at a residence or business comprising:
at least one grinder;
a first decomposer;
a second decomposer;
a third decomposer;
control valves, said control valves disposed in communication with said first decomposer, said second decomposer, and said third decomposer independently;
monitors, said monitors configured to observe and report status of said first decomposer, said second decomposer and said third decomposer;
electrochemical reactors, said electrochemical reactors disposed in communication with a programmable power supply;
pipelines;
a circulation pump, said circulation pump configured to circulate wastewater through said pipelines, to and from said decomposers;
filter mesh, said filter mesh disposed within said first decomposer, said second decomposer, and said third decomposer;
a programmable logic controller, said programmable logic controller configured to manage said control valves via electronic switches;
wherein said first decomposer, said second decomposer, and said third decomposer are configured to operate in stages such that primary decomposition occurs in only one of said first decomposer, said second decomposer, and said third decomposer at one time;
heat sources, said heat sources disposed within said first decomposer, said second decomposer, and said third decomposer;
wherein said heat sources are arranged such that they are positioned on the top, bottom, and sides of said first decomposer, said second decomposer, and said third decomposer; and
wherein said heat sources are configured to be heated during a decomposition mode of said first decomposer, said second decomposer, and said third decomposer.

7. A method of treating wastewater, including solids, from a sewage line on-site at a building comprising:
the wastewater flowing through pipelines to a sewage tank where a sewage pump conveys the wastewater though at least one grinder;
the grinder grinding undissolved solids of the wastewater;
the wastewater exiting the grinder and entering one of three decomposers via a circulation pump;
the circulation pump pumping the wastewater through one of three decomposers as the one of three decomposers is operating in a filtering mode;
the circulation pump pumping the wastewater though one of three decomposers as the one of three decomposers is operating in a decomposition mode;
the circulation pump pumping the wastewater though one of three decomposers as the one of three decomposers is operating in a cleaning mode;
a control system monitoring the status of the wastewater and the three decomposers via at least one turbidity meter, pH monitoring, and conductivity monitoring;
the wastewater flowing to a water tank via pipelines;
water quality meters testing and reporting quality of the wastewater within the water tank;
an ozone generator oxidating the wastewater;
at least one electrochemical reactor initiating a reducing reaction in the wastewater;
the wastewater exiting the water tank once the water quality meters affirm the wastewater has been cleaned to a specified degree as cleaned water; and
the cleaned water discharging through a reverse osmosis system.

* * * * *